United States Patent [19]
Gross et al.

[11] 4,235,956
[45] Nov. 25, 1980

[54] ELECTROCHEMICAL STORAGE BATTERY

[75] Inventors: Franz Gross, Neckargemünd; Hermann Birnbreier, Sandhausen, both of Fed. Rep. of Germany

[73] Assignee: Brown, Boveri & Cie Aktiengesellschaft, Mannheim-Däfertal, Fed. Rep. of Germany

[21] Appl. No.: 33,562

[22] Filed: Apr. 27, 1979

[30] Foreign Application Priority Data

Apr. 29, 1978 [DE] Fed. Rep. of Germany ....... 2819026

[51] Int. Cl.³ ........................................... H01M 10/39
[52] U.S. Cl. .................................... 429/112; 429/120
[58] Field of Search ................. 429/120, 62, 104, 112; 215/13 R

[56] References Cited

U.S. PATENT DOCUMENTS

| 254,607 | 4/1851 | Sulfrian | 215/13 R |
| 1,267,292 | 5/1918 | Vanstrom | 215/13 R |
| 1,466,941 | 9/1923 | Houze | 215/13 R |
| 3,167,159 | 1/1965 | Bovenkerk | 215/13 R |
| 3,397,720 | 8/1968 | Jones | 215/13 R |
| 3,424,622 | 1/1969 | Dechert | 429/120 |
| 3,915,741 | 10/1975 | Kogiso et al. | 429/120 |

Primary Examiner—Donald L. Walton
Attorney, Agent, or Firm—Herbert L. Lerner

[57] ABSTRACT

Electrochemical storage battery normally operating at an elevated temperature, surrounded by heat insulation to retard heat loss. The surrounding heat insulation is an enclosed gastight cavity under subatmospheric pressure to impede heat flow by convection, and a radiation shield in the interior of the cavity in the path of heat flow to reduce heat loss by radiation.

19 Claims, 6 Drawing Figures

ELECTROCHEMICAL STORAGE BATTERY

BACKGROUND OF THE INVENTION

1. Field of the Invention

The invention relates to an electrochemical storage battery, especially of the alkali metal-and sulfur type, with at least one storage cell and at least one heat insulation surrounding the storage cell.

2. Description of the Prior Art

Electrochemical storage batteries which operate at elevated temperatures, a temperature higher than 100° C. and above the ambient temperature, are usually surrounded by a heat-retarding insulation in order to prevent the storage cells from cooling down below the minimum temperature necessary for their operation. Conventional insulation, which is built up, for instance, from glass wool or mineral wool must have considerable wall thickness to have sufficient insulating effect. This is especially true if the storage battery operates at elevated temperatures, e.g., 300° C., and is to be held at approximately constant temperature over extended periods of time, e.g., hours. Since such thick-walled heat insulation increases the dimensions and/or the weight of the storage battery considerably, the energy storage density, i.e., the electric energy that can be stored per unit weight or volume, is small. This is a disadvantage especially for such electrochemical storage batteries which are to be used as power supply for electrically operated vehicles.

SUMMARY OF THE INVENTION

It is therefore an object of the invention to provide an electrochemical storage battery of the type mentioned at the outset, in which the dimensions and overall volume are small while the heat insulation is adequate. In addition, the construction of the heat insulation should be simple and the insulation should meet the requirements demanded by the operation of an electrochemical storage battery.

With the foregoing and other objects in view, there is provided in accordance with the invention an electrochemical storage battery having a normal operating temperature at an elevated temperature above ambient temperature with at least one storage cell and with heat insulation surrounding the storage cell to retard heat flow from the storage cell to the cooler surrounding environment, wherein the heat insulation is an enclosed gastight cavity under subatmospheric pressure surrounding said storage cell to impede heat flow by convection from the storage cell to the cooler surrounding environment and a radiation shield disposed in the interior of the cavity in the path of heat flow from the storage cell to the cooler surrounding environment to reduce heat losses due to radiation.

Other features which are considered as characteristic for the invention are set forth in the appended claims.

Although the invention is illustrated and described herein as embodied in an electrochemical storage battery, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which, FIG. 1 diagrammatically shows a storage battery according to the invention with thermal insulation in a vertical cross section taken along line I—I of FIG. 2 with parts lying behind the cross-sectional plane not being shown, and the thermal insulation having two boundary walls provided with spacing.

DETAILED DESCRIPTION OF THE INVENTION

Figure 1:
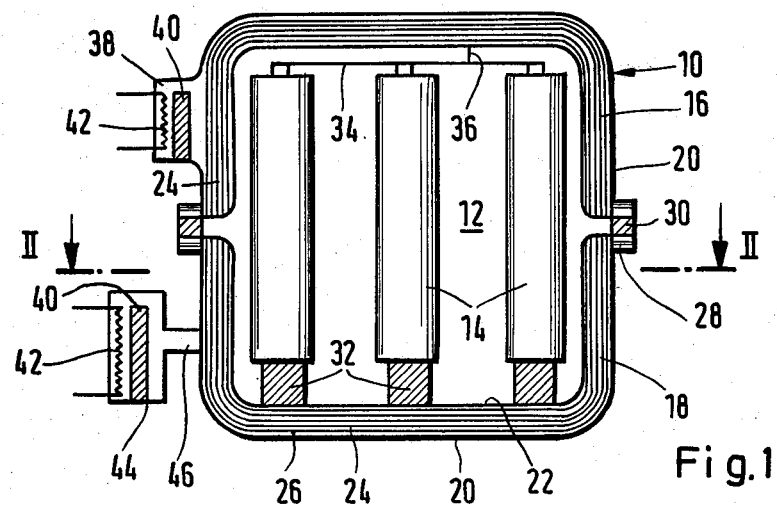

In accordance with the invention, the heat insulation has an at least largely evacuated cavity with at least one radiation shield which is inserted into the heat flow. The evacuated cavity then prevents or impedes a heat flow from the storage cells to the outside by convection, while the radiation shield prevents heat losses due to radiation or at least reduces them to a large extent. The thermal conductivity of such a heat insulation is about 100-times lower than for a heat insulation of glass wool with the same thickness. This is true particularly if, according to another embodiment of the invention, several radiation shields are inserted into the heat flow one after the other with spacing. In order to obtain the above-mentioned good heat retardation, the cavity should be evacuated at least so far that the residual gas pressure in the cavity is less than about $10^{-4}$ m bar.

The following rule may be applied: The residual gas pressure may be chosen so that the mean free path of the atoms and molecules of the gas is approximately equal to the spacing of the radiation shields from each other. In order to maintain the vacuum, it may be advantageous to arrange a getter in the cavity.

The cavity is advantageously formed between at least two boundary walls which surround the storage cell and between which the radiation shield is arranged. Quite generally, it is best if the boundary walls consist of metal, particularly of metals with low thermal conductivity such as steels alloyed with nickel, or glass. Thin foils of bare metal with low emittivity are preferably used as a radiation shield. Such metals are, for instance, aluminum or nickel. In order to avoid contact of the boundary walls and/or further radiation shields, spacers are inserted at some points.

To simplify the fabrication of the thermal insulation and to increase its stability, it is advantageous if the thermal insulation is composed of at least two, preferably equal insulation sections. Cup-shaped insulation sections are particularly preferred, so that they can be fastened to each other at their rims.

If the thermal insulation has electrically conducting boundary walls, then the insulation sections are advantageously connected to each other via at least one interposed electrical insulation. Thereby, the supply and take-off of current to and from the storage cells becomes very simple because the electrical connection of these storage cells to the outside can be accomplished via the electrically conducting insulation sections.

In another advantageous embodiment of the thermal insulation according to the invention, the entire battery interior to be insulated is an evacuated cavity with at least one outside wall. The storage cells are therefore arranged directly in the evacuated cavity which is tightly closed off from the outside by an outside wall.

The radiation shield can advantageously be arranged in the cavity itself and conformed or fitted to the profile of the outside wall and spaced therefrom, or the radiation shield can be placed directly around the storage cell, spaced therefrom, and conformed or fitted to its profile.

Also with this embodiment in a simple construction, the outside wall consists substantially of at least two parts which are put together gastight, are advantageously cup-shaped and are connected to each other at their rims in a gastight manner.

In many cases it is desirable to also be able to cool off a very well heat-insulated storage battery as rapidly as possible, for instance, for inspection and/or repair purposes. Therefore, a particularly preferred further embodiment of the invention is one in which a gas can be admitted to the cavity. This gas largely cancels the effect of the thermal insulation, so that a strong heat flow from the storage cell to the outside takes place and the storage battery is thus cooled down very quickly.

Admitting gas to the cavity must, of course, be reversible, i.e., it must be possible to remove the gas from the cavity to set the storage battery in operation, so as to restore the required insulating properties to the thermal insulation. In order to achieve this, it is advantageous to store the gas at the operating temperature of the storage cell in a solid-material storage device, to drive it out into the cavity by increasing the temperature of the solid-material storage device and to reabsorb it in the solid-material storage device upon cooling down. The solid-material storage device is advantageously equipped with a heater which can be controlled to vary the temperature of the storage device.

Such solid-material storage devices capable of absorbing gases in their crystal lattices and to so store them are known. If such a solid-material storage device is heated up, the gases are released by the crystal lattices and reabsorbed when cooled down to the starting condition. Hydrogen can be used as a suitable gas in the present case and a body of palladium can serve as the solid-material storage device.

It is preferred to make the thermal insulation with the profile of a circular cylinder, the outside diameter of which is approximately equal to the height of the heat insulation. An advantageous ratio of the surface to the volume surrounded by the insulation, is also obtained if the thermal insulation has approximately the shape of a cube.

An advantageous ratio between the cost of the structure and the insulating effect is obtained if the cavity encloses more than six and fewer than twelve storage cells. For good utilization of space it is advantageous to arrange one storage cell approximately in the region of the vertical central axis of the cavity.

Further advantages of the invention will be seen from the following description of embodiment examples in conjunction with schematic drawings.

Like parts are provided with the same reference symbols in the individual figures.

Figure 2:
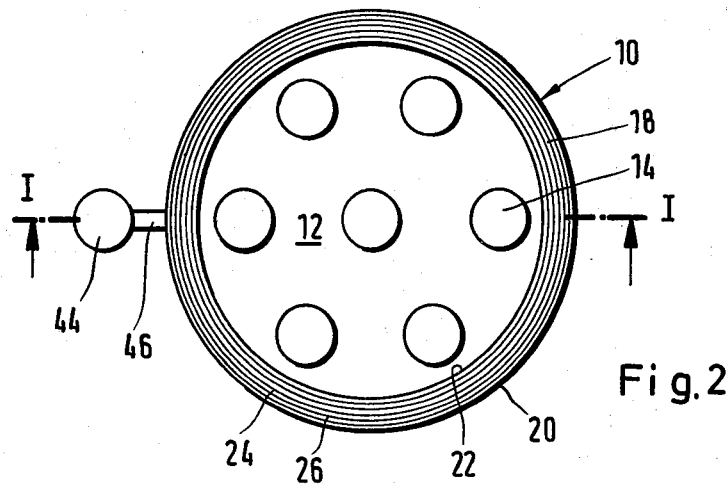
FIG. 2 is a horizontal cross section taken along line II—II of FIG. 1, with parts lying behind the section line not shown.

The electrochemical storage battery shown in FIGS. 1 and 2 has thermal insulation in the form of a circular cylinder 10, which surrounds the interior 12 of the battery, where the cylindrical storage cells 14 are arranged. For the sake of simplifying the presentation, the storage cells are indicated here only in outline. The height of the storage cells is about 200 to 400 mm with a diameter of about 20 to 50 mm. The height of the thermal insulation 10 approximately corresponds to its diameter, whereby a favorable ratio of the surface of the thermal insulation to the volume enclosed by the thermal insulation is obtained.

The thermal insulation is composed of two insulation sections 16, 18 with a horizontal parting gap. Each of these insulation sections 16 and 18 is cup-shaped and has two boundary walls 20 and 22 uniformly spaced, which are joined together at the cup rims. The two boundary walls 20, 22 then enclose the cavity 24 which is evacuated to an extent that a residual gas pressure of less than $10^{-4}$m bar prevails therein. In the cavity 24 are further provided several, and in particular, more than ten radiation shields 26 which are spaced from each other and from the boundary walls 20, 22 and extend over the entire area of the cavity 24, as can be seen from FIGS. 1 and 2.

As a rule, the radiation shields are flat and follow the profile of the boundary walls 20, 22, the spacing of which is approximately constant; however, it is also possible to make the radiation shields corrugated or wrinkled. In any event, it is important that the radiation shields do not touch each other and/or the boundary walls but have small spacing of, for instance, less than 1 mm. To ensure this spacing, spacers with low thermal conductivity can be inserted at some points, the number of which should be as small as possible in order to avoid thermal bridges. The spacing of the boundary walls is obtained from the number of the radiation shields and the spacings provided.

The material of the boundary walls 20, 22 is advantageously a metal with low thermal conductivity, i.e., an iron alloy which contains nickel and chromium. Thin polished metal foils which may consist, for instance, of aluminum are used as radiation shields.

The cup-shaped insulation sections 16 and 18 each have at their rims outward-pointing flanges 28 which serve for fastening the two insulation sections 18 and 16 to each other, by means of fastening means, not shown. Electrical insulation 30 in the form of an insulating ring is placed between the flanges 28, so that there is no electrical connection of any kind between the insulation section 18 and the insulation section 16.

The storage cells 14 arranged in the interior of the battery are supported on the inner boundary wall 22 with the interposition of electrically conducting blocks 32. Here, the blocks 32 serve at the same time for the electrical connection of the outside surfaces of the storage cells 14, which outside surfaces represent one electrical pole of the storage cells, to the lower insulation section 18.

The second electrical poles of the storage cells 14, which are at the upper ends, are connected to each other via an electric wire 34 and are connected via the lead 36 to the inner boundary wall of the upper insulation section 16 in an electrically conducting manner. This makes possible a simple supply and take-off of current to the storage cells 14 via the insulation sections 16 and 18. No separate leads which would have to go through the thermal insulation 10, are necessary.

The outer boundary wall 20 of the upper insulation section 16 has a bulge, so that the cavity 24 has an extension 38. A solid-material storage device 40 in the form of a metal body, with a heater 42 as an electrical heating coil is accommodated in this extension 38. A gas is embedded in the crystal lattice of the solid-material storage device. The gas can be driven out by heating. This process is reversible, i.e., the driven-out gas is reabsorbed by the crystal lattice if the solid-material storage device is cooled down to its original temperature. Palladium can serve for the solid-material storage device and hydrogen can be used as the gas.

The lower insulation section 18 has an embodiment variant with respect to the arrangement of the solid-material storage device 40. The solid-material storage device 40 is accommodated here in a tubular receptacle 44, the interior of which is in communication with the cavity 24 via a pipe 46. This embodiment variant is intended particularly for retrofitting. In a storage battery, both insulation sections 16 and 18 will, of course, be equipped with the same type of solid-material storage device, i.e., both insulation sections will be made identical, which simplifies production.

The storage cells 14, which in the present embodiment example are of the sodium-and-sulfur type, require a temperature of about 300° C. for operation. In conjunction with the radiation shields 26, the evacuated cavity 24 of the thermal insulation 10 provides excellent heat retardation, which is about 100-times better than the heat retardation with a layer of rock wool or glass wool of the same thickness. The danger of undesired cooling-off is therefor very small.

Since a temperature rise to undesirably high values can occur during charging or discharging of the storage cell 14 due to its internal electric resistance, provision must be made to give off this excess heat to the environment in a simple manner. It must likewise be possible to cool down the storage cell 14 as quickly as possible for repair and/or inspection work. This purpose is served by the gas-charged solid-material storage devices 40. This gas is embedded in the solid-material storage devices 40 at the operating temperature of the storage battery and the thermal insulation is thus fully effective. If now heat is to be given off by the storage cells to the outside, the solid-material storage devices 40 are heated up by means of the heaters 42, so that the stored gas is driven out of the crystal lattice and enters the cavity 24. In the process, it also fills, of course, the spaced formed between the individual radiation shields. This gas largely cancels the effect of the thermal insulation 10 by causing heat transport between the inner boundary wall 22 and the outer boundary wall 20 through convection, so that heat is removed from the storage cells 14 to the outside. For this purpose, it is necessary, of course, that the interior 12 of the battery also contains a gas, usually air, so as to make good heat transfer from the storage cells 14 to the inner boundary wall 22 possible.

If the storage cells 14 are cooled down to the desired extent and the thermal insulation is to become effective again, the electric heater 42 is switched off again, so that the solid-material storage device 40 can cool down and reabsorb the gas in its crystal lattice. As a result, the cavity 24 is evacuated again and develops its full insulating effect.

Figure 3:
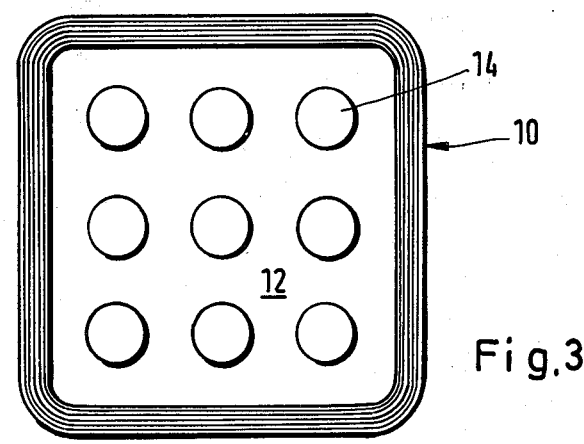
FIG. 3 is a variant of a storage battery according to the invention shown in a horizontal cross section similar to FIG. 2.

A cross section through an embodiment variant of a storage battery is shown in FIG. 3, in which the cross section is taken similarly to the section II—II of FIG. 1. The difference from FIG. 1 or 2 is that the storage battery according to FIG. 3 has a cube-like outline and the individual storage cells are arranged in rows in the interior 12 of the battery, while the storage cells 14 as per FIGS. 1 and 2 are arranged about a storage cell arranged in the center of the battery interior 12.

Figure 4:
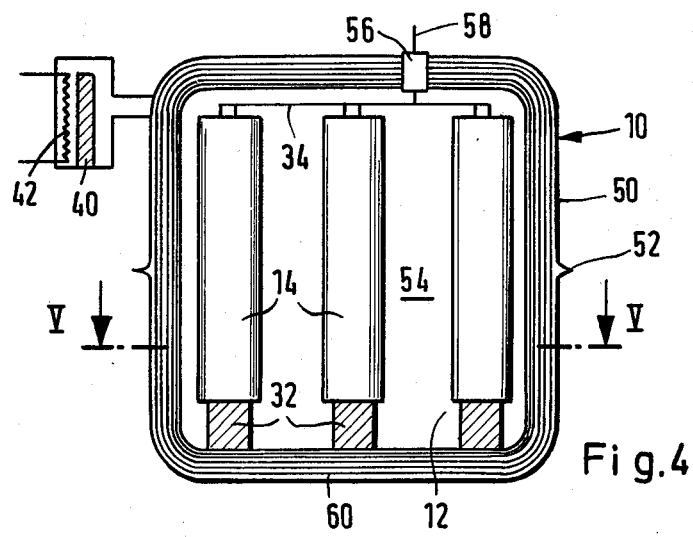
FIG. 4 is a variant of a storage battery with respect to the thermal insulation where the entire interior is designed as an evacuated cavity and shown in a vertical section.
Figure 5:
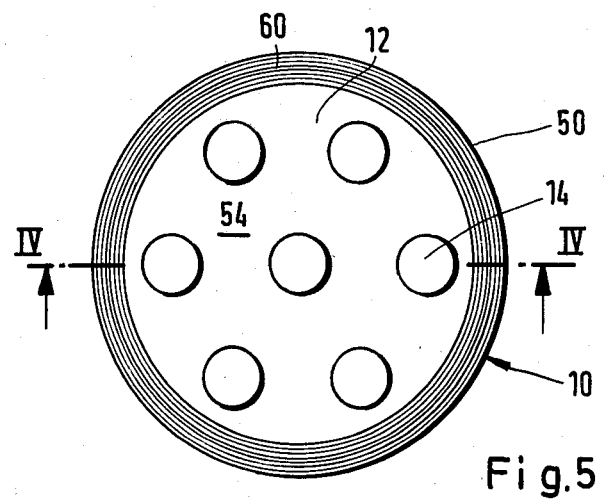
FIG. 5 is a horizontal cross section taken along line V—V of FIG. 4.

In FIGS. 4 and 5, a further embodiment variant of a storage battery with thermal insulation 10 is shown. The outer boundary wall 50 is formed here by two identical cup-shaped metallic parts which are flanged at their horizontal rims 52 and are welded together to form a gastight joint. As in the embodiment example according to FIG. 1, the radiation shields 60 are spaced from each other as well as spaced from the boundary wall 50. An inner boundary wall such as is necessary in the embodiment example as per FIG. 1, is not used in the present embodiment example, since in the present embodiment example, the entire interior 12 of the battery is evacuated and therefore serves as the evacuated cavity 54. The storage cells 14 are arranged in this cavity 54 and are supported on the bottom of the thermal insulation 10 by means of the metallic conducting blocks 32. The blocks 32 serve at the same time for supply and take-off of the electric current to one pole of the storage cells 14. The current is fed here via the outer boundary wall 50, as in the embodiment example according to FIG. 1.

In order to prevent the thin radiation shields from being pushed together by the weight of the storage cells, spacers should be inserted, of course, between the individual radiation shields and the outer boundary wall, especially in the area of the blocks 32. Individual spacers are of advantage also in the other regions to hold the radiation shields in the intended position.

The second poles of the storage cells 14 are connected to each other by an electric wire 34, from which a section 58 leading to the outside is branched off. The line section 58 is inserted into the thermal insulation 10 in a gastight manner and brought out through an insulator 56.

A solid-material storage device 40 with its heater 42 is further provided in order to fill the evacuated cavity 54 with gas, in case it should be necessary under certain operating conditions to give off heat to the outside.

Figure 6:
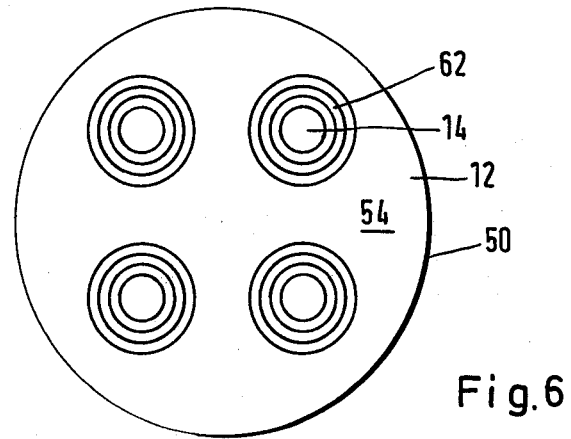
FIG. 6 is a variant of a storage battery in a horizontal section in which each cylindrical storage cell is surrounded by a radiation shield.

FIG. 6 shows an embodiment variant of the storage battery according to FIG. 4 in a cross section which corresponds approximately to the section V—V. Here, too, the entire interior of the battery is evacuated and thus forms the cavity 54. As in the embodiment example as per FIGS. 4 and 5, this cavity 54 is closed off from the outside by the boundary wall 50. In the present embodiment example, the radiation shields 62 are arranged around the individual storage cells 14, as can clearly be seen from FIG. 6. Regarding the fabrication and mounting of the radiation shields, this embodiment has advantages, since these radiation shields are made smaller than in the embodiment example of FIGS. 4 and 5 and can therefore be produced more easily.

The advantages of the storage battery according to the invention come to bear particularly if the storage battery requires high temperatures for operation, such as is the case, for instance, in storage batteries of the sodium-and-sulfur type (operating temperature about 300° C.). A very effective protection against heat losses is achieved, which can be cancelled if necessary. Added to this is the fact that the weight and overall volume of the thermal insulation are small, which is of particular merit for vehicle batteries.

There are claimed:

1. An electrochemical storage battery having a normal operating temperature at an elevated temperature above ambient temperature with at least one storage cell and with heat insulation surrounding the storage cell to retard heat flow from the storage cell to the cooler surrounding environment, wherein the heat insulation is an enclosed gastight cavity under subatmospheric pressure surrounding said storage cell to impede heat flow by convection from the storage cell to the cooler surrounding environment and a radiation shield disposed in the interior of the cavity in the path of heat flow from the storage cell to the cooler surrounding environment to reduce heat losses due to radiation, wherein the heat insulation is composed of at least two insulation sections connected to each other via interposed electrical insulation, wherein the boundary walls of one insulation section are electrically conducting with one electrical pole of the storage cell electrically connected to said one insulation section, and wherein the boundary walls of another insulation section are electrically conducting with the other electrical pole of the storage cell electrically connected to said another insulation section.

2. Storage battery according to claim 1, wherein the storage cell has an anode chamber with an alkali metal anolyte, a cathode chamber with a sulfur containing catholyte, and the chambers separated from each other by a solid electrolyte.

3. Storage battery according to claim 1, wherein a plurality of spaced apart radiation shields are disposed in the interior of the cavity.

4. Storage battery according to claim 3, wherein ten to twenty radiation shields with a spacing of less than about 1 mm between two shields are disposed in the cavity.

5. Storage battery according to claim 1, wherein the cavity is formed between two boundary walls which surround the storage cell and between which the radiation shield is disposed.

6. Storage battery according to claim 1, wherein the heat insulation forming the surrounding cavity is composed of two, about equal, insulation sections.

7. Storage battery according to claim 6, wherein the two insulation sections have the shape of cups in the form of a lower cup and an upper cup.

8. Storage battery according to claim 7, wherein an electrically conducting block disposed between the inner boundary wall of the lower cup and the storage cell forms the electrical connection of one pole of the storage cell to the lower insulation section, and wherein the boundary wall of the upper cup is connected by an electric lead to the other electric pole of the storage cell.

9. Storage battery according to claim 1, wherein gas can be admitted to the cavity.

10. Storage battery according to claim 9, wherein the gas is stored at the operating temperature of the storage cell in a solid-material storage device, and wherein the gas can be driven out into cavity by increasing the temperature of the solid-material storage device, and wherein the gas is reabsorbed by the solid-material storage device if the temperature is lowered.

11. Storage battery according to claim 10, wherein the solid-material storage device is equipped with a heater to increase the temperature of the solid-material storage device and drive out gas contained therein.

12. Storage battery according to claim 1, wherein the enclosed gastight cavity has the profile of a circular cylinder with an outside diameter approximately equal to the height of the enclosure.

13. Storage battery according to claim 1, wherein the enclosed gastight cavity has the approximate shape of a cube.

14. Storage battery according to claim 1, wherein the battery has more than six and fewer than twelve storage cells.

15. Storage battery according to claim 14, wherein a storage cell is arranged in the battery in the region of its vertical central axis.

16. An electrochemical storage battery having a normal operating temperature at an elevated temperature above ambient temperature with at least one storage cell and with heat insulation surrounding the storage cell to retard heat flow from the storage cell to the cooler surrounding environment, wherein the heat insulation is an enclosed gastight cavity under subatmospheric pressure surrounding said storage cell to impede heat flow by convection from the storage cell to the cooler surrounding environment and a radiation shield disposed in the interior of the cavity in the path of heat flow from the storage cell to the cooler surrounding environment to reduce heat losses due to radiation, wherein the entire interior of the battery to be insulated is an evacuated cavity with at least one outer boundary wall and, wherein the radiation shield is disposed around the storage cell and conforms to its profile.

17. Storage battery according to claim 16, wherein the boundary wall consists of at least two parts assembled together to form a gastight wall.

18. Storage battery according to claim 17, wherein the two parts are in the shape of cups and are connected to each other at their rims.

19. Storage battery according to claims 1 or 16, wherein the inner space has a residual gas pressure in which the mean free path length of the atoms and molecules is approximately equal to the spacing of the radiation shields.

* * * * *